(12) United States Patent
Hasegawa

(10) Patent No.: US 8,210,743 B2
(45) Date of Patent: Jul. 3, 2012

(54) TEMPERATURE SENSOR CIRCUIT

(75) Inventor: Kazuo Hasegawa, Oizumi-Machi (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 528 days.

(21) Appl. No.: 12/509,094

(22) Filed: Jul. 24, 2009

(65) Prior Publication Data

US 2010/0046580 A1 Feb. 25, 2010

(30) Foreign Application Priority Data

Aug. 20, 2008 (JP) .................................. 2008-212156

(51) Int. Cl.
*G01K 15/00* (2006.01)
*G01K 7/01* (2006.01)

(52) U.S. Cl. ............ 374/178; 374/170; 374/172; 374/1; 702/130; 702/99; 327/512

(58) Field of Classification Search .............. 374/1, 170, 374/171, 172, 178, 100, E7.001; 327/512, 327/513, 478, 432, 108, 100, 208, 288, 285, 327/411, 409, 413, 427, 581, 307; 702/130, 702/131, 132, 99, 133, 134, 135, 13
See application file for complete search history.

(56) References Cited

U.S. PATENT DOCUMENTS

| | | | | |
|---|---|---|---|---|
| 4,797,577 A | * | 1/1989 | Hing | 327/539 |
| 5,039,878 A | * | 8/1991 | Armstrong et al. | 327/512 |
| 5,087,830 A | * | 2/1992 | Cave et al. | 327/539 |
| 5,327,028 A | * | 7/1994 | Yum et al. | 327/362 |
| 5,519,354 A | * | 5/1996 | Audy | 327/512 |
| 5,961,215 A | * | 10/1999 | Lee et al. | 374/178 |
| 6,373,330 B1 | * | 4/2002 | Holloway | 327/539 |
| 6,400,219 B1 | * | 6/2002 | Fayed | 330/9 |
| 6,445,238 B1 | * | 9/2002 | Lesea | 327/262 |
| 6,509,782 B2 | * | 1/2003 | Chowdhury | 327/512 |
| 6,531,911 B1 | * | 3/2003 | Hsu et al. | 327/512 |
| 6,870,421 B2 | * | 3/2005 | Abe | 327/539 |
| 7,565,258 B2 | * | 7/2009 | Duarte | 702/132 |
| 7,618,186 B2 | * | 11/2009 | Kwon et al. | 374/170 |
| 7,857,510 B2 | * | 12/2010 | Liepold et al. | 374/178 |
| 2004/0252749 A1 | * | 12/2004 | Randazzo | 374/178 |
| 2007/0216468 A1 | * | 9/2007 | Duarte | 327/513 |
| 2007/0286259 A1 | * | 12/2007 | Kwon et al. | 374/170 |
| 2010/0007404 A1 | * | 1/2010 | Hwang | 327/512 |
| 2011/0057718 A1 | * | 3/2011 | Snoeij et al. | 327/512 |
| 2011/0158286 A1 | * | 6/2011 | Peterson | 374/170 |

\* cited by examiner

*Primary Examiner* — Gail Verbitsky

(74) *Attorney, Agent, or Firm* — Westerman, Hattori, Daniels & Adrian, LLP

(57) ABSTRACT

A temperature sensor circuit includes a band-gap reference voltage circuit. The resistor and diode-connected bipolar transistor of the band-gap reference voltage circuit are separated into a transistor-resistor series circuit and a transistor-diode series circuit. The transistor-resistor series circuit is configured such that an emitter of the bipolar transistor Q21 is connected to a power supply voltage terminal $V_{CC}$, a collector thereof is grounded via the resistor R2. The transistor-diode series circuit is configured such that an emitter of the bipolar transistor Q20 is connected to the power supply voltage terminal $V_{CC}$, a collector thereof is connected to a collector of the diode-connected bipolar transistor Q19, and an emitter of the diode-connected bipolar transistor is grounded. A voltage divider circuit 5 having a plurality of output terminals is connected to the transistor-resistor series circuit and the transistor-diode series circuit via first and second buffer circuits 3 and 4, respectively.

20 Claims, 10 Drawing Sheets

TEMPERATURE SENSOR CIRCUIT

This application claims priority under 35 U.S.C. §119 to Japanese Patent Application No. 2008-212156 filed on Aug. 20, 2008, the entire disclosure of which is incorporated herein by reference in its entirety.

BACKGROUND OF THE INVENTION

1. Field of the Invention

The present invention relates to a temperature sensor circuit. More specifically, it relates to a temperature sensor circuit, which is one of semiconductor temperature sensor circuits, preferably for use in detecting an ambient temperature for performing temperature compensation of electrical circuits.

2. Description of the Related Art

Conventionally, as a temperature sensor circuit of this type, it is well-known to employ a band-gap reference voltage circuit as a basic constitutional element, which is configured to output an output voltage having a predetermined temperature coefficient.

This type of temperature sensor circuit can be preferably used to adjust, for example, offset and/or gain for the purpose of conducting temperature compensation in an electrical circuit as disclosed by, for example, Japanese Patent No. 2,897,401, Japanese Patent No. 2,666,620, Japanese Examined Laid-open Patent Publication No. H07-6847, Japanese Unexamined Laid-open Patent Publication No. H05-45233, and Japanese Patent No. 3,606,876.

The aforementioned conventional temperature sensor circuits, however, are configured to output a voltage having a positive or negative predetermined temperature coefficient, and are not configured to selectively output a predetermined voltage having an arbitrarily determined temperature coefficient. Therefore, when making any adjustment in accordance with an ambient temperature in an actual electrical circuit, it was necessary to prepare another circuit for creating an output voltage having a predetermined temperature coefficient in accordance with the ambient temperature.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a temperature sensor circuit capable of selectively obtaining an output voltage having a positive temperature coefficient falling within a predetermined range, an output voltage having a negative temperature coefficient falling within a predetermined range, or an output voltage having a temperature coefficient falling within a predetermined range covering both negative and positive temperature coefficients, and also capable of selectably setting a cross-point of temperature coefficient output temperature characteristics to a predetermined temperature.

According to a first aspect of the present invention, a temperature sensor circuit includes a band-gap reference voltage circuit configured to offset a positive temperature coefficient of a voltage appeared at a resistor and a negative temperature coefficient of a base-emitter voltage of a diode-connected bipolar transistor. The resistor and the diode-connected bipolar transistor are separated into a transistor-resistor series circuit in which a bipolar transistor and a resistor are connected in series, and a transistor-diode series circuit in which a bipolar transistor and a diode-connected bipolar transistor are connected in series. The transistor-resistor series circuit is configured such that an emitter of the bipolar transistor is connected to a power supply voltage terminal, a collector thereof is connected to one end of the resistor, and the other end of the resistor is grounded. On the other hand, the transistor-diode series circuit is configured such that an emitter of the bipolar transistor is connected to the power supply voltage terminal, a collector thereof is connected to a collector of the diode-connected bipolar transistor, and an emitter of the diode-connected bipolar transistor is grounded. The temperature sensor circuit further includes a first buffer circuit in which an input terminal thereof is connected to the one end of the resistor of the transistor-resistor series circuit, and a second buffer circuit in which an input terminal thereof is connected to a collector of the diode-connected bipolar transistor of the transistor-diode series circuit. A voltage divider circuit is connected between an output terminal of the first buffer circuit and an output terminal of the second buffer circuit, and configured to divide the voltage appeared between the output terminals so that a voltage having any one of temperature coefficients different from each other can be extracted.

According to a second aspect of the present invention, a temperature sensor circuit includes a band-gap reference voltage circuit including a transistor-resistor-diode series circuit in which a bipolar transistor, a resistor, and a diode-connected bipolar transistor are connected in series. An emitter of the bipolar transistor is connected to a power supply voltage terminal, a collector thereof is connected to a collector of the diode-connected bipolar transistor via the resistor, and an emitter of the diode-connected transistor is grounded. The temperature sensor circuit further includes an output circuit connected to the band-gap reference voltage circuit. The output circuit includes a transistor-resistor series circuit in which a bipolar transistor and a resistor are connected in series, and a transistor-diode series circuit in which a bipolar transistor and a diode-connected bipolar transistor are connected in series. The transistor-resistor series circuit is configured such that an emitter of the bipolar transistor is connected to the power supply voltage terminal, a collector thereof is connected to one end of the resistor, and the other end of the resistor is grounded, while the transistor-diode series circuit is configured such that an emitter of the bipolar transistor is connected to the power supply voltage terminal, a collector thereof is connected to a collector of the diode-connected bipolar transistor, and an emitter of the diode-connected bipolar transistor is grounded. The bipolar transistor of the transistor-resistor-diode series circuit, the bipolar transistor of the transistor-resistor series circuit, and the bipolar transistor of the transistor-diode series circuit are mutually connected at bases thereof. The temperature sensor circuit further includes a voltage divider circuit connected to the output circuit and configured to divide a voltage appeared between the one end of the resistor of the transistor-resistor series circuit and a collector of the diode-connected bipolar transistor of the transistor-diode series circuit so that a voltage having any one of temperature coefficients different from each other can be extracted.

According to the present invention, the temperature sensor circuit is capable of selectively obtaining an output voltage having any positive temperature coefficient falling within a predetermined range, an output voltage having any negative temperature coefficient falling within a predetermined range, or an output voltage having a temperature coefficient falling within a predetermined range covering both negative and positive temperature coefficients, and also can set the cross-point of these temperature coefficients to a predetermined temperature by merely adjusting the resistance value of the resistor without the need of complex circuits.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, an embodiment of the present invention will be explained with reference to the attached drawings.

Figure 1:
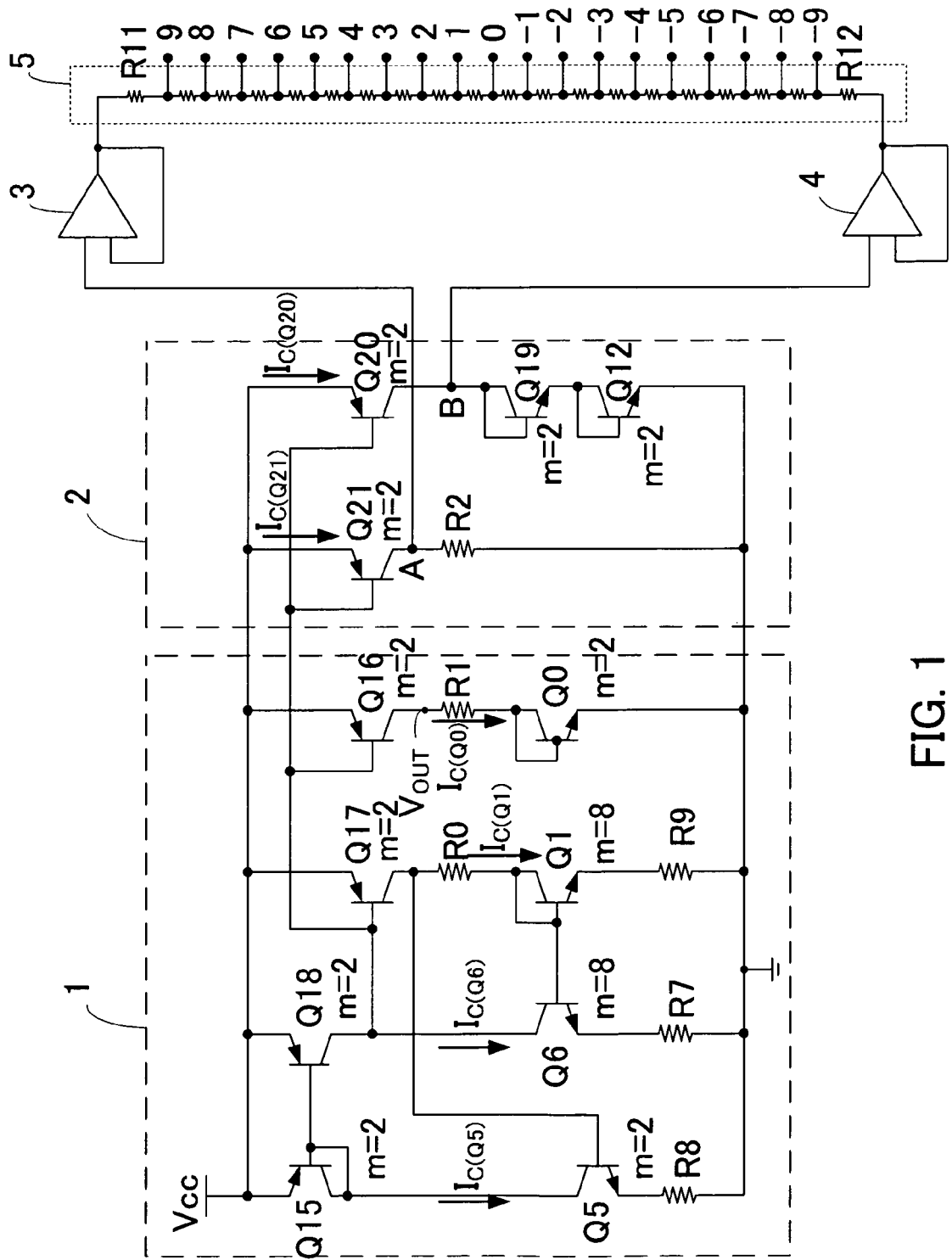
FIG. 1 is a schematic circuit diagram of a temperature sensor circuit according to a first embodiment of the present invention.

FIG. 1 shows a schematic block diagram of a temperature sensor circuit according to a first embodiment of the present invention. The temperature sensor circuit includes a band-gap reference constant-voltage circuit (constant-voltage circuit) 1, an output circuit 2 connected to the band-gap reference constant-voltage circuit 1 to extract output voltages having positive and negative temperature coefficients, and a voltage divider circuit configured to extract a voltage having a certain temperature coefficient by dividing the difference of voltages between an output voltage of the output circuit 2 having a positive temperature coefficient and an output voltage of the output circuit 2 having a negative temperature coefficient via buffer amplifiers.

In FIG. 1, the left portion 1 surrounded by dashed lines is a circuit called a band-gap reference constant-voltage circuit. In the temperature sensor circuit according to the present invention, the structure of the band-gap reference constant-voltage circuit portion 1 is not specifically limited, and can be any arbitrarily selected conventionally known circuit. The specific circuit shown in FIG. 1 is an improved version of a conventionally known band-gap reference constant-voltage circuit having a new structure itself which achieves specific effects. Therefore, this circuit 1 can be preferably used for a temperature sensor circuit according to the present invention.

Figure 6:
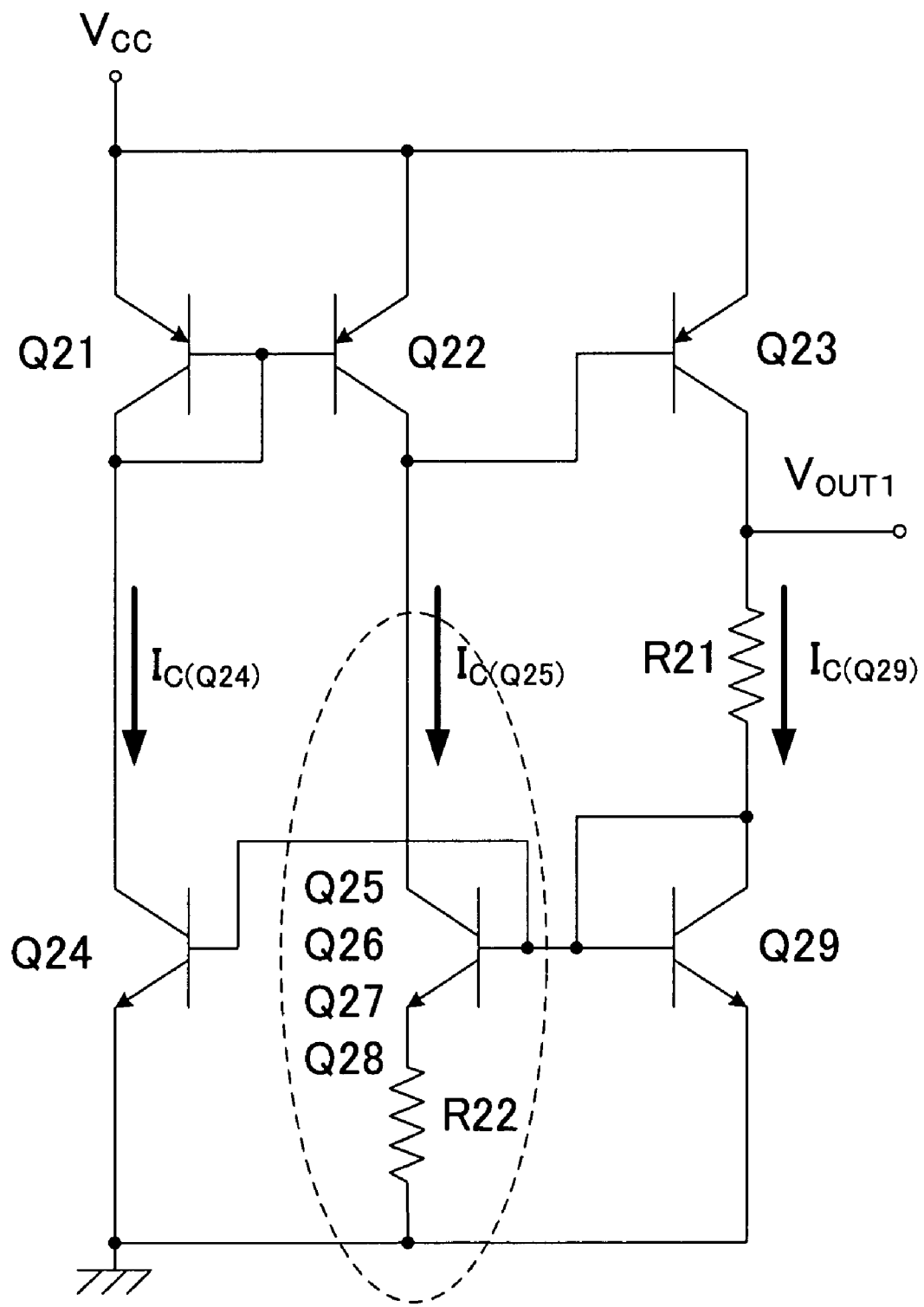
FIG. 6 is a circuit diagram of a conventional band-gap reference voltage circuit (constant-voltage circuit)

The band-gap reference constant-voltage circuit 1 in this embodiment will be described in detail while comparing it with conventionally known circuits. FIG. 6 shows a conventionally known band-gap reference constant-voltage circuit. This bendgap reference constant-voltage circuit includes bipolar transistor Q21 to Q29, and resistance elements R21 and R22. Among the abovementioned transistors, the transistors Q21 and Q29 are each diode-connected.

The diode-connected transistor Q21 and the transistor Q24 are connected in series to form a first series circuit. The emitter of the transistor Q21 is connected to the power source voltage Vcc, the collector thereof is connected to the collector of the transistor Q24, and the emitter of the transistor Q24 is grounded. Further, the transistor Q22, the parallel-connected transistors Q25 to Q28 and the resistor R22 are connected in series to form a second series circuit. The emitter of the transistor Q22 is connected to the power source voltage Vcc, the collector thereof is connected to the collectors of the transistors Q25 to Q28, and the emitters of the transistors Q25 to Q28 are grounded via the resistor R22. The diode-connected transistor Q21 constituting the first series circuit and the transistor Q22 constituting the second series circuit are connected at bases, forming a current mirror circuit. Furthermore, the base of the transistor Q24 constituting the first series circuit and the bases of the transistors Q25 to Q28 constituting the second series circuit are connected.

Also, the transistor Q23, the resistor R21, and the diode-connected transistor Q29 are connected in series to form a third series circuit. The emitter of the transistor Q23 is connected to the power source voltage $V_{CC}$ and the collector thereof is connected to the collector of the diode-connected transistor Q29 via the resistor R21, and the emitter of the transistor Q29 is grounded. The base of the transistor Q23 constituting the third series circuit is connected to the collector of the transistor Q22 constituting the second series circuit. Also, the transistors Q25 to Q28 constituting the second series circuit and the transistor Q29 constituting the third series circuit are connected at bases, forming a current mirror circuit.

In the abovementioned circuit, the collector current $I_{C(Q24)}$ of the transistor Q24, the collector current $I_{C(Q25)}$ of the transistors Q25 to Q28, and the collector current $I_{C(Q29)}$ of the transistor Q29 become mutually equal regardless of fluctuations of the power source voltage $V_{CC}$, and the following condition is established.

$$I_{C(Q24)} = I_{C(Q25)} = I_{C(Q29)}$$

Therefore, the output voltage $V_{OUT1}$ has a constant-voltage characteristic.

Figure 7:
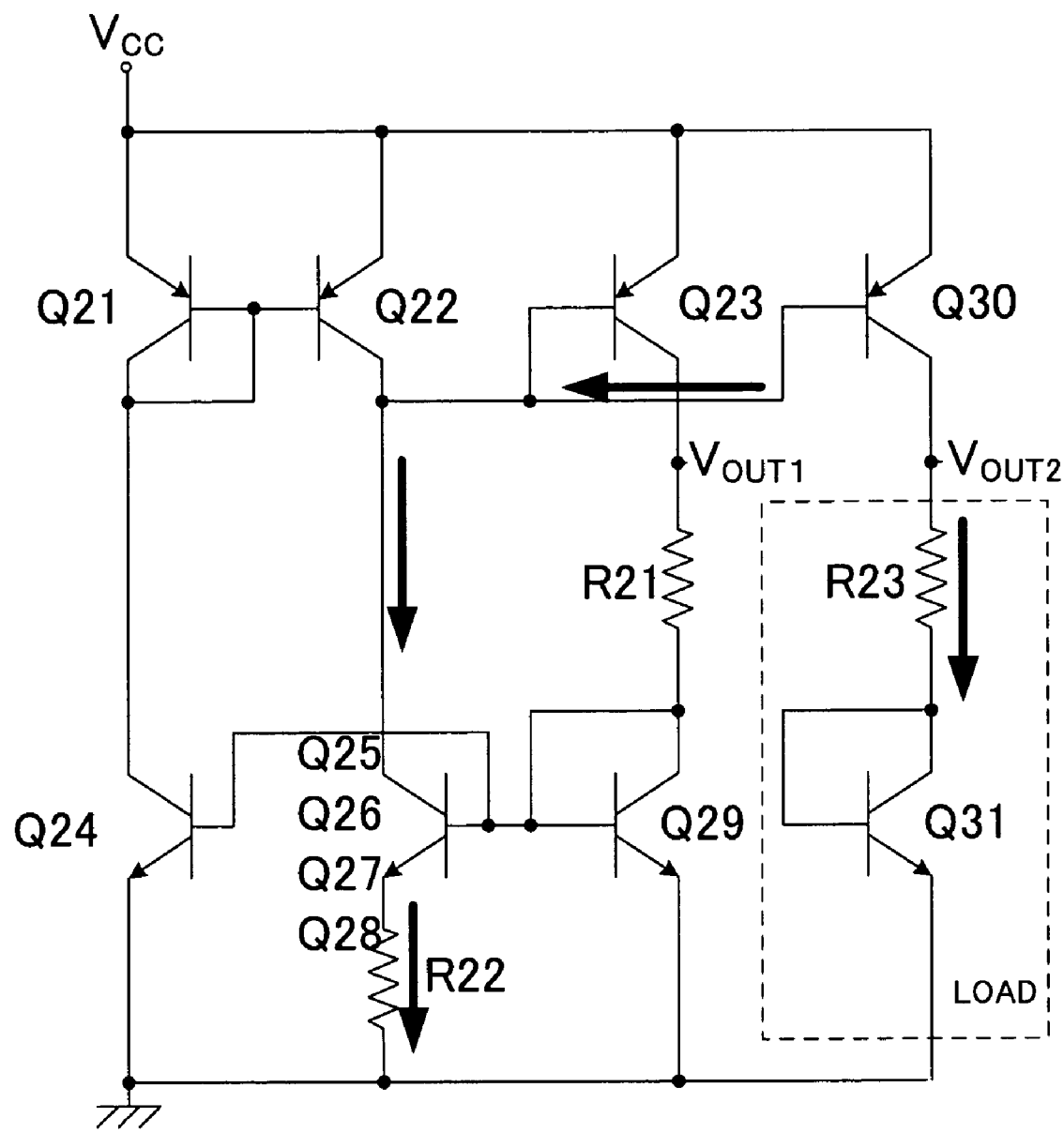
FIG. 7 is a circuit diagram in which a load is connected to the conventional band-gap reference voltage circuit.

In this state, as shown in FIG. 7, when an output system in which a bipolar transistor Q30, a resistor R23, and a diode-connected bipolar transistor Q31 are connected in series is added, as the collector current of the transistor Q31 increases, as shown by the arrow, it is required to increase the base current corresponding to 1/hfe times of the increased amount of the collector current. In this circuit, however, the circuit becomes stable when the current flowing through the resistor R22 and the current flowing through the resistor R21 are approximately equal, so the current of the resistor R22 will not change. In other words, the total base current of the transistor Q30 and transistor Q23 is the same as that of the first circuit shown in FIG. 6, so the base current per each circuit decreases. This decreases the collector current, which in turn decreases the output voltage $V_{OUT1}$ and the output voltage $V_{OUT2}$. From another viewpoint, when the collector current is considered as a constant current source, the collector current changes in accordance with fluctuations of the load resistance (R23, Q31). In other words, the constant current characteristic is poor.

Figure 8:
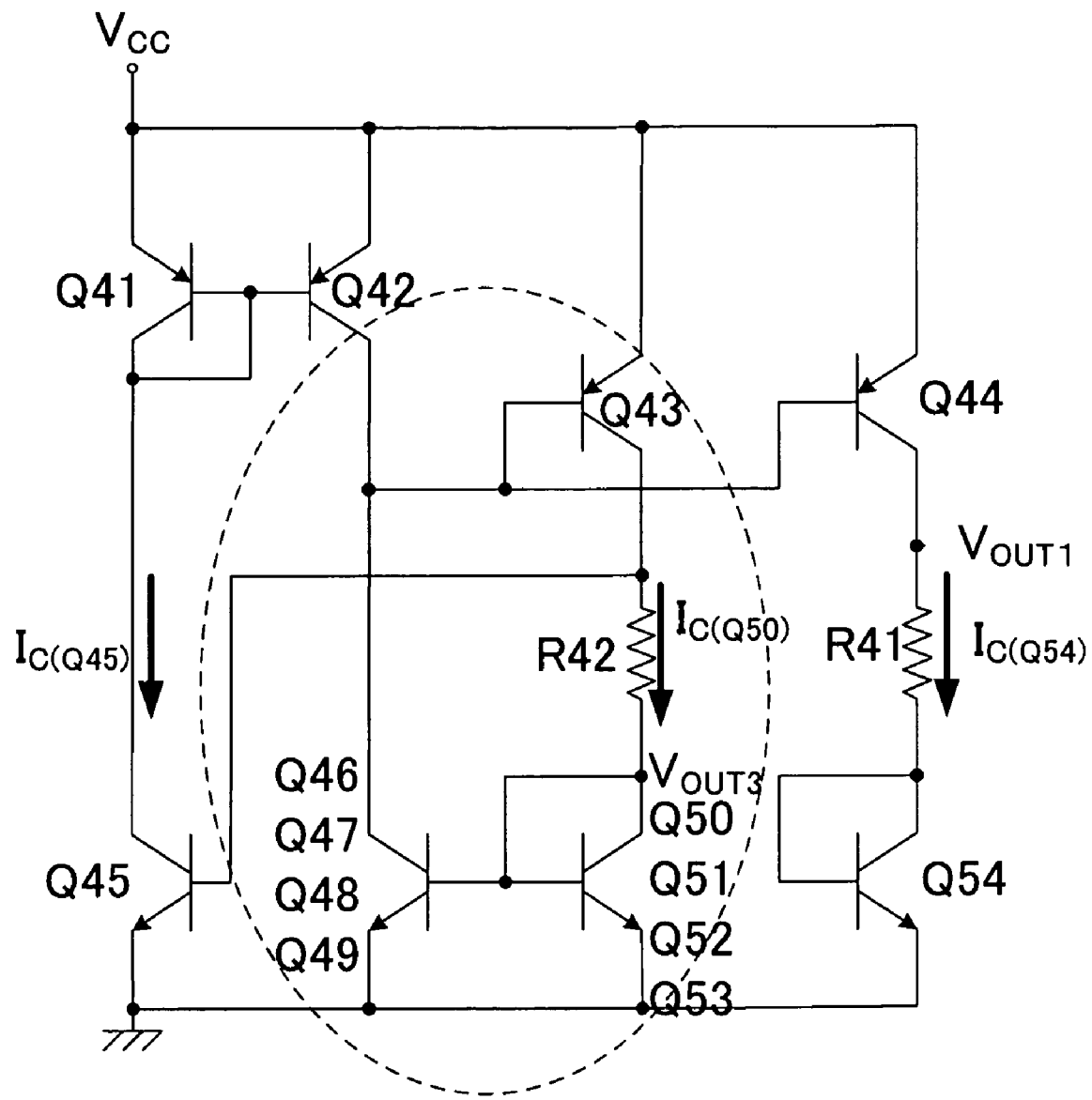
FIG. 8 is a circuit diagram of an improved band-gap reference voltage circuit (constant-voltage circuit)

In order to solve the problems, in the present embodiment, as shown in the portion in FIG. 8 surrounded by dashed lines, the portion including transistors Q25 to Q28 surrounded by dashed lines as shown in FIG. 6 is separated into one group of transistors Q46 to Q49 and the other group of transistors Q50 to Q53 as shown in FIG. 8 and these transistors Q46 to Q49 and Q50 to Q53 are formed into a current mirror circuit.

The circuit shown in FIG. 8 will be described in detail. The diode-connected transistor Q41 and the transistor Q45 are connected in series, forming a first series circuit. The emitter of transistor Q41 is connected to the power source voltage $V_{CC}$, the collector thereof is connected to the collector of the transistor Q45, and the emitter of transistor Q45 is grounded. Further, the transistor Q42 and the parallel-connected transistors Q46 to Q49 are connected in series, forming a second series circuit. The emitter of the transistor Q42 is connected to the power source voltage $V_{CC}$, the collector thereof is connected to the collectors of the transistors Q46 to Q49, and the emitters of transistors Q46 to Q49 are grounded. The diode-connected transistor Q41 forming the first series circuit and the transistor Q42 forming the second series circuit are connected at bases, forming a current mirror circuit. Further, a transistor Q43, a resistor R42, and diode-connected transistors Q50 to Q53 are connected in series, forming a third series circuit. The emitter of the transistor Q43 is connected to the power source voltage $V_{CC}$, the collector thereof is connected to the collectors of diode-connected transistors Q50 to Q53 via the resistor R42, and the emitters of the transistors Q50 to Q53 are grounded. The base of transistor Q43 forming the third series circuit is connected to the collector of the transistor Q42 forming the second series circuit. Also, the parallel-connected transistors Q46 to Q49 forming the second series circuit and the parallel-connected transistors Q50 to Q53 forming the third series circuit are connected at bases, forming a current mirror circuit. Furthermore, one end of the resistor R42 forming the third series circuit (the collector side connecting terminal of the transistor Q43) is connected to the base of the transistor Q45 forming the first series circuit. Further, a transistor Q44, a resistor R41, and a diode-connected transistor Q54 are connected in series, forming a fourth series circuit. The emitter of the transistor Q44 is connected to the power source voltage $V_{CC}$, the collector thereof is connected to one end of resistor R41, and the other end of the resistor R41 is connected to the collector of a diode-connected transistor Q54. The emitter of the diode-connected transistor Q54 is grounded. The base of the transistor Q44 is connected to the base of the transistor Q43 of the third series circuit.

In the abovementioned circuit, the collector current $I_{C(Q45)}$ of the transistor Q45 forming the first circuit, the collector current $I_{C(Q50)}$ of the transistors Q50 to Q53 forming the third series circuit, and the collector current $I_{C(Q54)}$ of the transistor Q54 forming the fourth series circuit become approximately equal mutually regardless of fluctuations of the power source voltage $V_{CC}$, and the following condition is established and the circuit becomes stable.

$$I_{C(Q45)} = I_{C(Q50)} = I_{C(Q54)}$$

Therefore, in this circuit, the output voltage $V_{OUT1}$ has a constant-voltage characteristic.

Figure 9:
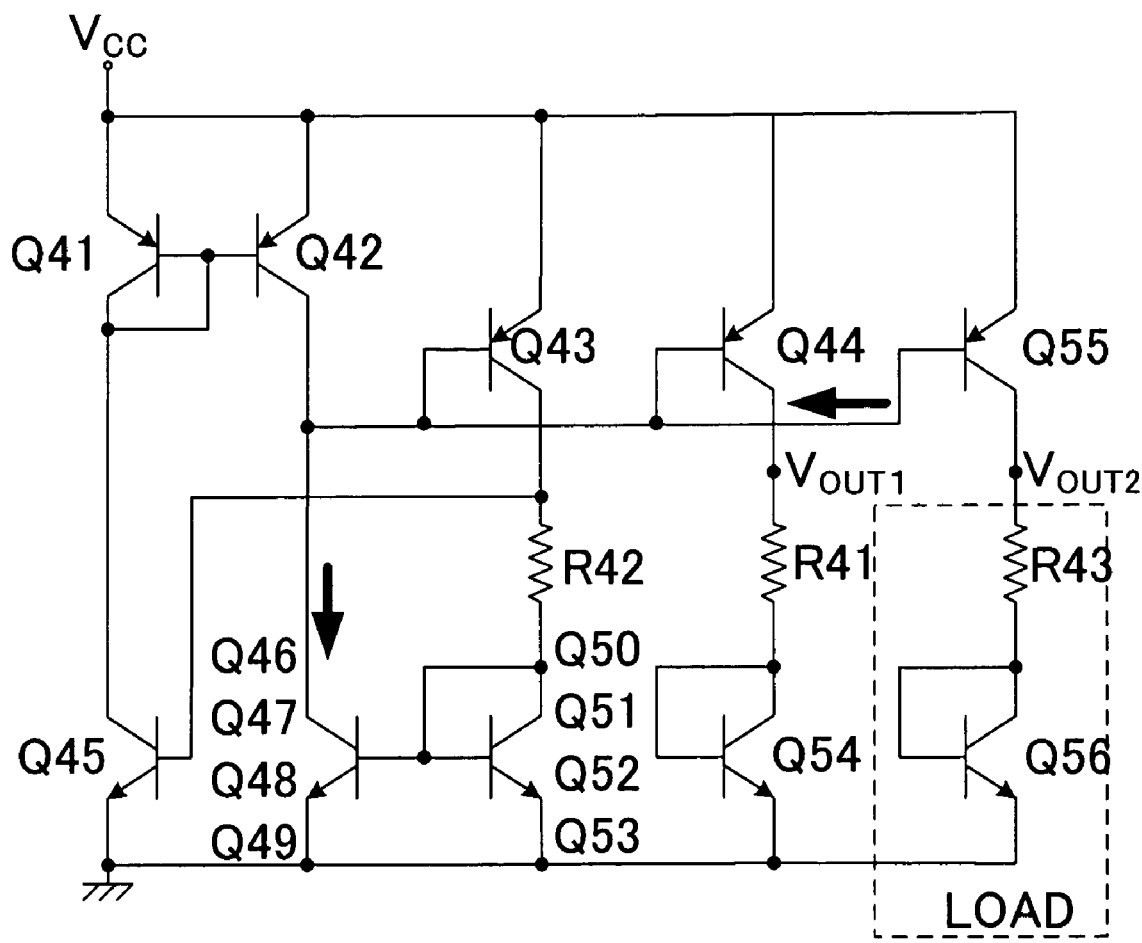
FIG. 9 is a circuit diagram in which a load is connected to the improved band-gap reference voltage circuit.

In this state, as shown in FIG. 9, when an output system in which a bipolar transistor Q55, a resistor R43, and a diode-connected bipolar transistor Q56 are connected in series is added, as the corrector current of the transistor Q56 increases, as shown by the arrow in FIG. 9, the base current of the transistor Q55 increases by the amount corresponding to 1/hfe times of the increased amount of the collector current. In this improved circuit, however, the increased amount of the base current flows through the collectors of the transistors Q46 to Q49 forming the second series circuit, exerting less effects on the resistor R42 forming the third series circuit, which prevents voltage reductions of the output voltages $V_{OUT1}$ and $V_{OUT2}$. In other words, by separating the transistors Q25 to Q28 in the conventionally circuit as shown in FIG. 6 into the current mirror circuit of the transistors Q46 to Q49 and Q50 to Q53 as shown in FIG. 9, the reference for operation is handled by the transistors Q50 to Q53, the resistor R42 and the transistor Q45, and the driving of the transistors Q43 and Q44 (and Q55) are handled by the transistors Q46 to Q49 to reduce effects on the next stage series circuit.

As mentioned above, in the conventional circuit shown in FIG. 7, when the collector current of the transistor Q30 of the output system is considered as a constant current source, fluctuations of the load resistance (R13 and Q31) causes changes in the collector current. In other words, the constant current characteristic is poor. In contrast, in the new and improved circuit as shown in FIG. 9, when the collector current of the transistor Q55 forming the output system is considered as a constant current source, the current changes with respect to the fluctuations of load resistance (R43 and Q56) become smaller. In other words, the constant current characteristics are improved. Therefore, in the present embodiment, the band-gap reference constant-voltage circuit shown in FIG. 8 can be preferably used. However, it should be noted that the conventional circuit shown in FIG. 6 and/or any other conventionally known circuits can also be used.

Returning to FIG. 1, the left portion 1 surrounded by dashed lines corresponds to the circuit shown in FIG. 8. In this circuit, bipolar transistors are used for the transistors Q0 to Q20. That is, a diode-connected transistor Q15, a transistor Q5, and a resistor R8 are connected in series, forming a first series circuit. A transistor Q18, a transistor Q6, and a resistor R7 are connected in series, forming a second series circuit. Further, a transistor Q17, a resistor R0, and a diode-connected transistor Q1, and a resistor R9 are connected in series, forming a third series circuit. Further, a transistor Q16, a resistor R1, and a diode-connected transistor Q0 are connected in series, forming a fourth series circuit. In the drawing, "m"

denotes the number of parallel-connected transistors. The other structures are the same as those of the circuit shown in FIG. 8, the cumulative explanation will be omitted.

The emitter resistors R8, R7, and R9 connected to the emitter of each of the transistors Q5, Q6, and Q1 are inserted to improve the activation characteristics and variations at low temperatures, and they are resistor elements of the same type and having the same resistance value.

In the abovementioned circuit, the collector current $I_{C(Q5)}$ of the transistor Q5 forming the first circuit, the collector current $I_{C(Q6)}$ of the transistor Q6 forming the second series circuit, the collector current $I_{C(Q1)}$ of the transistor Q1 forming the third series circuit, and the collector current $I_{C(Q0)}$ of the transistor Q0 forming the fourth series circuit become approximately equal regardless of fluctuations of the power source voltage $V_{CC}$, and the following condition is established and the circuit becomes stable.

$$I_{C(Q5)} = I_{C(Q6)} = I_{C(Q1)} = I_{C(Q0)}$$

The base-emitter voltage $V_{BE(Q5)}$ of the transistor Q5 is represented by the following equation:

$$V_{BE(Q5)} = V_T \ln(I_{C(Q5)}/Is)$$

where $V_T$ is a thermal voltage (kT/q), Is is a reverse direction collector saturation current, and T is an absolute temperature.

Similarly, the base-emitter voltage $V_{BE(Q6)}$ of the transistor Q6 can be represented by the following equation:

$$V_{BE(Q6)} = V_T \ln(I_{C(Q6)}/4Is)$$

Also, the base-emitter voltage $V_{BE(Q5)}$ of the transistor Q5 can be represented by the following equation when the voltage of both ends of the resistor R0 is $V_{R0}$:

$$V_{BE(Q5)} = V_{R0} + V_{BE(Q1)}$$

From this equation, since $V_{BE(Q6)}$ equals to $V_{BE(Q1)}$ ($V_{BE(Q6)} = V_{BE(Q1)}$), $V_{R0}$ can be represented as follows:

$$\begin{aligned} V_{R0} &= V_{BE(Q5)} - V_{BE(Q6)} \\ &= V_T \ln(I_{C(Q5)}/Is) - V_T \ln(I_{C(Q6)}/4Is) \\ &= V_T \ln 4. \end{aligned}$$

From the above equation, it is understood that the voltage $V_{R0}$ of both ends of the resistor R0 is a function of $V_T$ having a positive temperature characteristic.

Further, the base-emitter voltage $V_{BE(Q5)}$ of the transistor Q5 and the base-emitter voltage $V_{BE(Q0)}$ of the transistor Q0 are equal to each other, and they are equal to the sum of the voltage $V_{R0}$ of both ends of the resistor R0 and the base-emitter voltage $V_{BE(Q5)}$ of the transistor Q1, and therefore the following equation can be formulated:

$$V_{BE(Q5)} = V_{BE(Q0)} = V_{R0} + V_{BE(Q1)}$$

Since the collector current $I_{C(Q1)}$ of the transistor Q1 forming the third series circuit becomes equal to the collector current $I_{C(Q0)}$ of the transistor Q0 forming the fourth series circuit, the following equation can be formulated:

$$I_{C(Q1)} = I_{C(Q0)}$$

Therefore, the $V_{R1}$ voltage of both ends of the resistor R1 can be represented as follows:

$$\begin{aligned} V_{R1} &= R1 \cdot I_{C(Q1)} \\ &= R1 \cdot [(V_T \ln 4)/R0] \\ &= (R1/R0) \cdot (V_T \ln 4). \end{aligned}$$

Therefore, the output voltage $V_{OUT}$ of the connection point where the resistor R1 and the collector of transistor Q16 are connected is represented as follows:

$$V_{OUT} = V_{BE(Q0)} + (R1/R0) \cdot (V_T \ln 4)$$

On the other hand, the collector current $I_{C(Q1)}$ of the transistor Q0 is represented as follows:

$$I_{C(Q1)} = (V_T \ln 4)/R0$$

Figure 2:
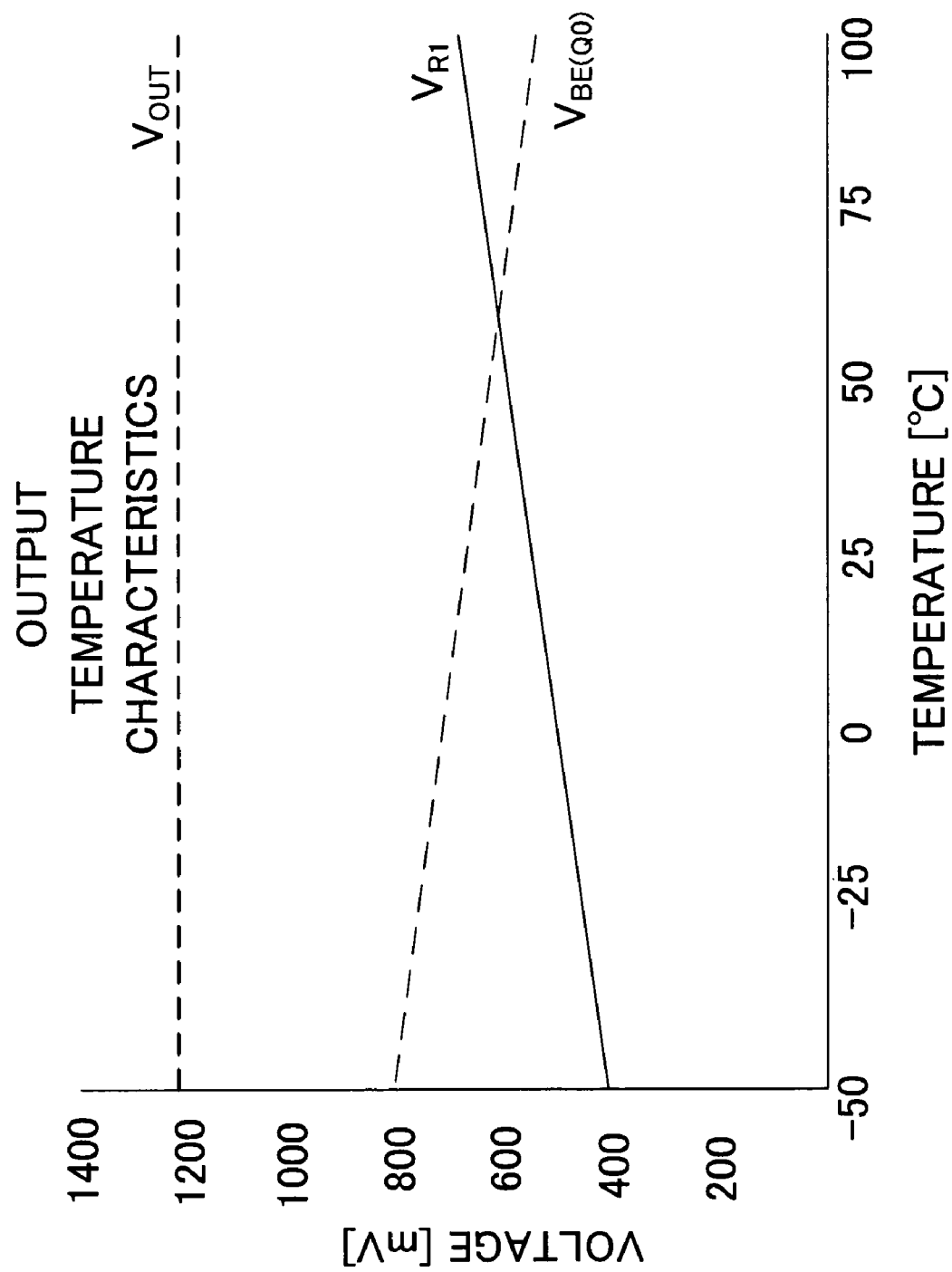
FIG. 2 is a diagram of output temperature characteristics showing each voltage of a constant-voltage circuit.

Thus, in this constant-voltage circuit 1, by combining the voltage having a positive temperature coefficient that appears at both ends of the resistor R1 and the base-emitter $V_{BE(Q0)}$ of the transistor Q0 having a negative temperature coefficient, an output voltage $V_{OUT}$ which is constant regardless of temperature changes can be obtained. The temperature characteristics of the voltage $V_{OUT}$ of the output terminal of the abovementioned constant-voltage circuit 1, the temperature characteristics of the terminal voltage $V_{R1}$ of the resistor R1, and the temperature characteristics of the base-emitter voltage $V_{BE(Q0)}$ of the transistor Q0 are shown in FIG. 2. That is, $V_{R1}$ has a positive temperature coefficient and $V_{BE(Q0)}$ has a negative temperature coefficient.

In this temperature sensor circuit of this embodiment, for the purpose of extracting a voltage having a positive temperature coefficient falling within a predetermined range, a voltage having a negative temperature coefficient falling within a predetermined range, and/or a voltage having a temperature coefficient falling within a predetermined range covering both position and negative temperature coefficients, this temperature sensor circuit using the abovementioned constant-voltage circuit 1 is provided with an output circuit 2 connected to the constant-voltage circuit 1 and surrounded by dashed lines, and a voltage divider circuit configured to output a voltage having any desired temperature coefficient by inputting an output voltage having a positive temperature coefficient and an output voltage having a negative temperature coefficient of the output circuit 2 into respective buffer amplifiers 3 and 3 and dividing the electrical potential between the output terminals of the buffer amplifiers 3 and 3. The output circuit 2 includes transistors Q21, Q20, Q19, Q12 and a resistor R2. The transistors Q19 and Q12 are diode-connected, respectively. The transistor Q21 and the resistor R2 are connected in series, the emitter of the transistor Q21 is connected to the power source voltage $V_{CC}$ of the constant-voltage circuit 1, the base thereof is connected to the base of the transistor Q16, and the collector thereof is connected to one end of the transistor R2. The other end of the resistor R2 is grounded. Further, similarly, the emitter of the transistor Q20 is connected to the power source voltage $V_{CC}$, and the base thereof is connected to the base of the transistor Q16. The collector of the transistor Q20 is connected to the collector of the transistor Q19, and the emitter of the transistor Q19 is connected to the collector of the transistor Q12, and the emitter of the transistor Q12 is grounded.

Figure 3:
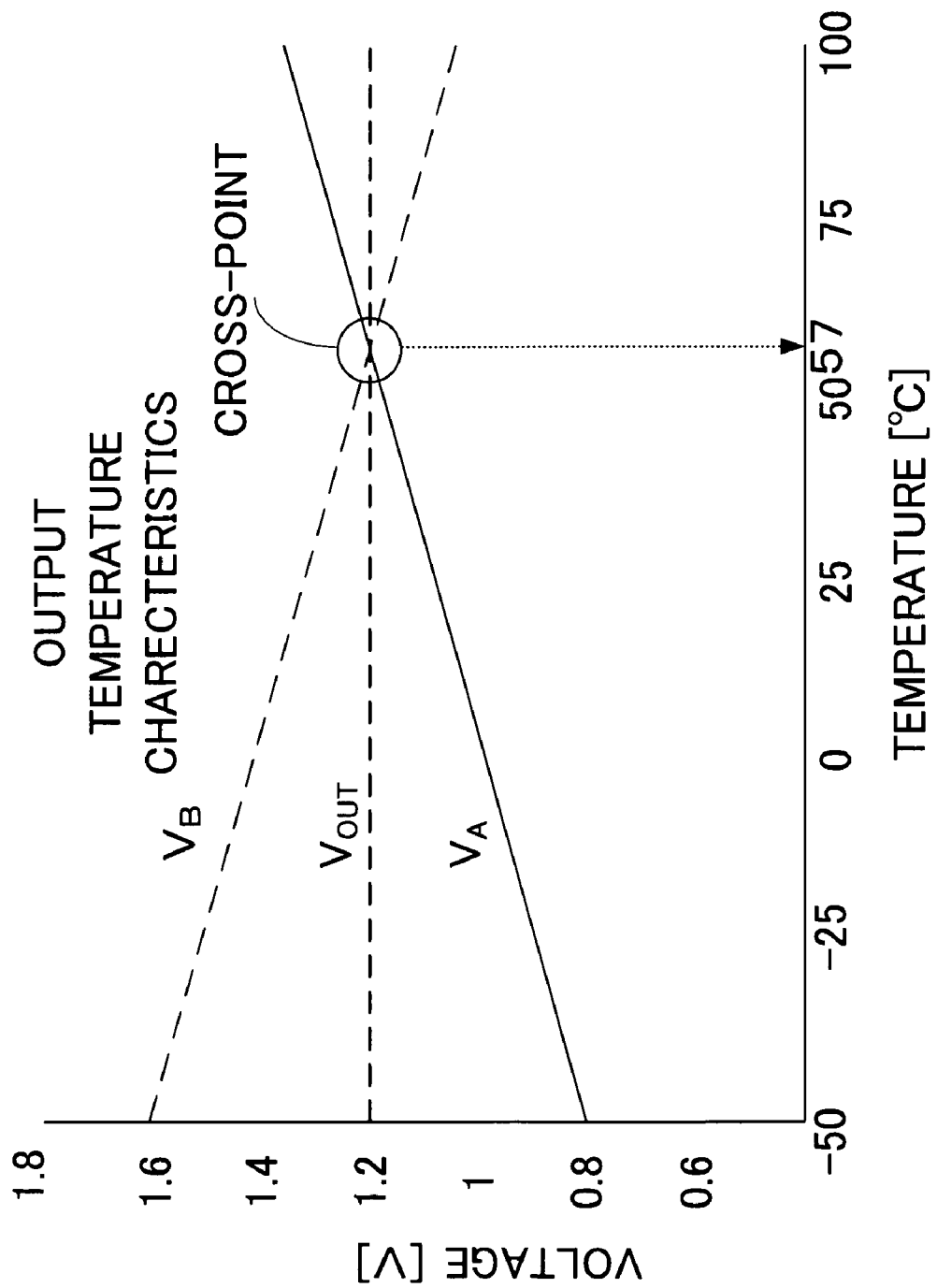
FIG. 3 is a diagram of output temperature characteristics showing each voltage of an output circuit.

In the output circuit 2, the current $I_{C(Q21)}$ flowing through the transistor Q21 and the current $I_{C(Q20)}$ flowing through the transistor Q20 become the same value as the current $I_{C(Q0)}$ of the constant-voltage circuit 1. Therefore, the electrical potential $V_A$ that appears at the connection point A of the transistor Q21 and the resistor R2 has a positive temperature characteristic, and the electrical potential $V_B$ that appears at the connection point B of the transistor Q20 and the transistor Q19 has a negative temperature characteristic. In this circuit according to this embodiment, two diode-connected transistors Q19 and Q12 are connected in series to match the voltage of 1.2V since the band-gap voltage is around 1.2 V. The resistor R1 and the resistor R2 are set so that their ratio is 1:2 in resistance. Therefore, in this state, the temperature characteristic of the voltage $V_{OUT}$ of the output terminal, the temperature characteristic of the voltage $V_A$ of the connection point A, and the temperature characteristic of the voltage $V_B$ of the connection point B are as shown in FIG. 3. As shown in this figure, the cross-point of the temperature characteristics of these voltages is around 57° C.

The voltage $V_A$ having a positive temperature coefficient extracted from the connection point A of the output circuit 2 is inputted into the buffer amplifier 3, and the voltage $V_B$ having a negative temperature coefficient extracted from the connection point B is inputted into the buffer amplifier 4. A voltage divider circuit 5 including a ladder resistor is disposed between the output terminal of the buffer amplifier 3 and the output terminal of the buffer amplifier 4. The voltage divider circuit 5 includes a resistor R11 connected to the output terminal of the buffer amplifier 3, a resistor R12 connected to the output terminal of the buffer amplifier 4, and a ladder resistor connected in series between both the resistors R11 and R12, and is configured to extract a desired divided voltage from one of a plurality of output terminals (9 to −9 in this illustrated embodiment). The ladder resistor is not especially limited, but, for example, can be preferably a plurality of MOS transistors connected in series. In this case, it is preferable to interpose one or a plurality of MOS transistors between the buffer amplifier 3 and one end of the resistor ladder, and interpose one or a plurality of MOS transistors between the buffer amplifier 4 and the other end of the resistor ladder. With this structure, any one of voltages having only positive temperature coefficients falling within a predetermined range, only negative temperature coefficients falling within a predetermined range, or temperature coefficients falling within a predetermined range covering both positive and negative temperature coefficients can be extracted from the output terminals of the resistor ladder. The number of output terminals of the ladder resistor can be set arbitrarily.

By additionally inserting resistors R11 and R12 to both ends of the ladder resistor, it is possible to extract a voltage having any positive or negative temperature coefficient, or a voltage having a temperature coefficient falling within a predetermined range covering from a positive temperature coefficient to a negative temperature coefficient from each terminal (9 to −9 in this illustrated embodiment), such as, e.g., only a voltage falling within a predetermined range having positive temperature coefficients, only a voltage falling within a predetermined range having negative temperature coefficients, or a voltage falling within a predetermined range covering from a positive temperature coefficient to a negative temperature coefficient.

As described above, the cross-point of the output temperature characteristics of the voltages appearing at output terminals in an ordinary design is about 57° C. However, when applying it to actual electric circuits, the ambient temperature is, for example, a normal temperature (25° C.). For this reason, in actual use, at the actual use temperature (e.g., 25° C.), there is a drawback that a voltage different from the set voltage may improperly occur. Therefore, the temperature at the cross-point needs to be set to, for example, a normal temperature (25° C.) or other temperature according to the condition for use.

Figure 4:
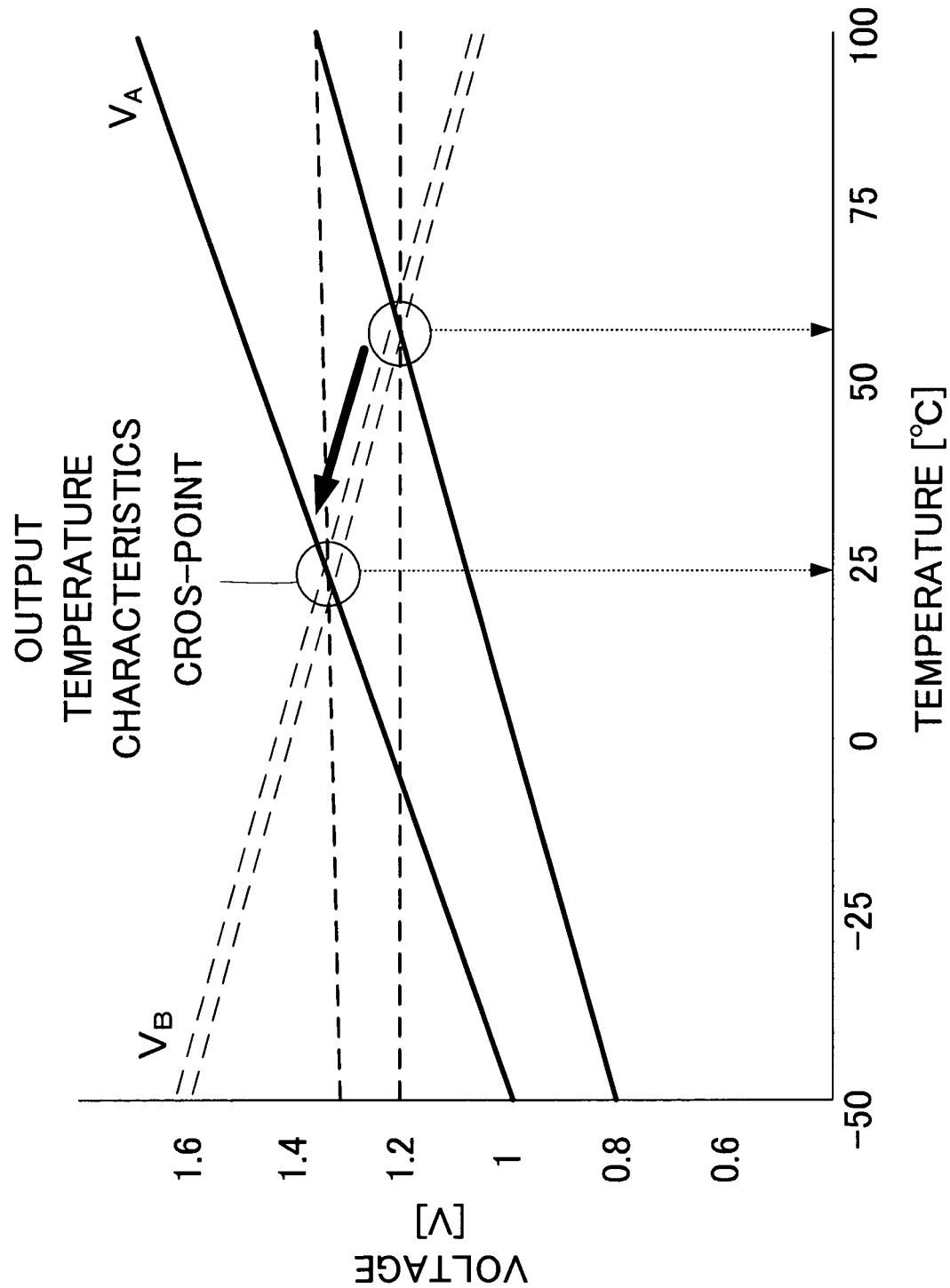
FIG. 4 is a diagram of output temperature characteristics showing an adjustment of the cross-point.

The voltage $V_B$ at the terminal B is almost constant and therefore cannot be adjusted, but the cross-point can be changed by adjusting the resistance value of the resistor R2. FIG. 4 shows the adjustment of the cross-point. In this embodiment, the cross-point is adjusted to be from around 57° C. to around 25° C. As described above, the temperature of the cross-point is not limited to 25° C., and can be adjusted as needed.

Figure 5:
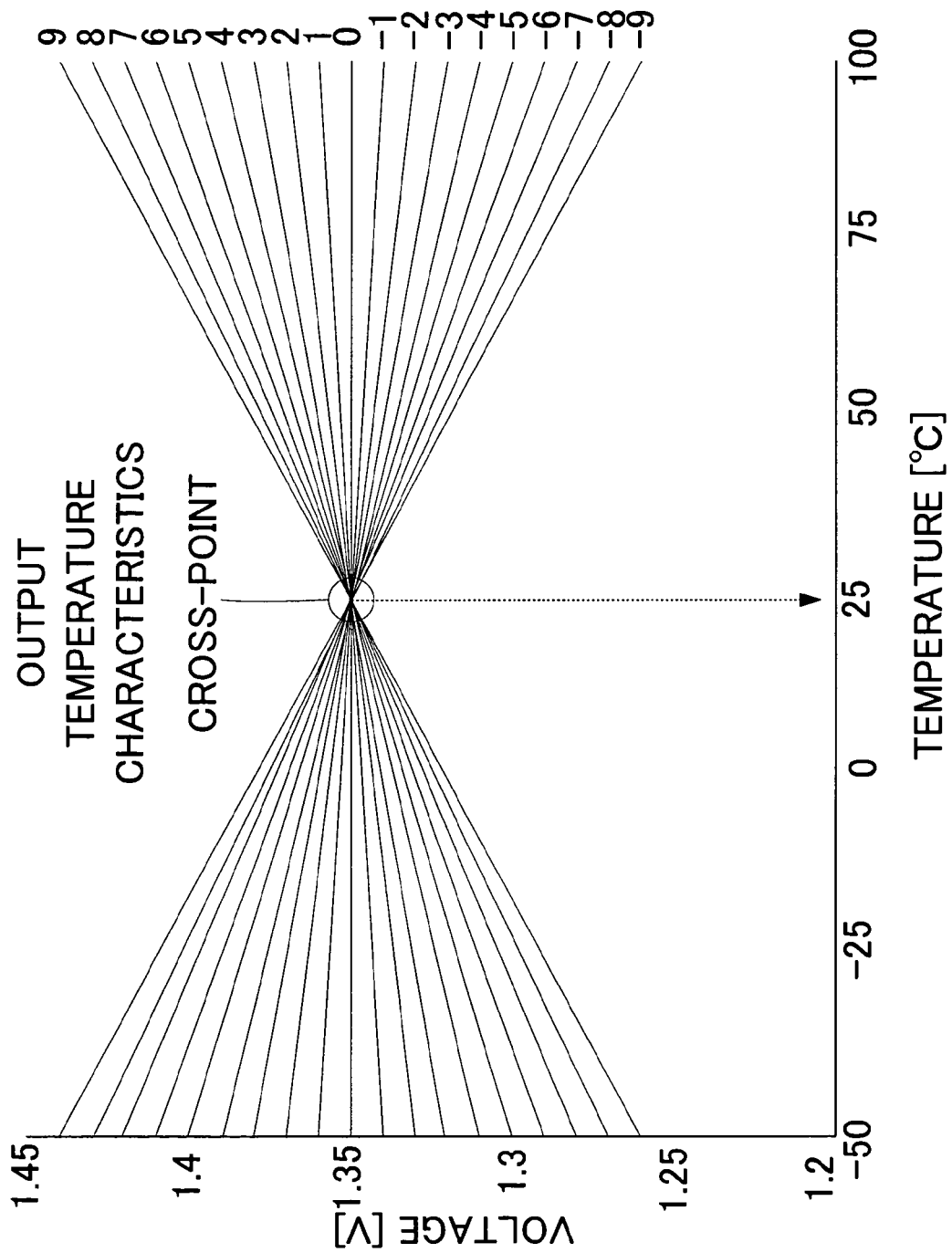
FIG. 5 is a diagram of output temperature characteristics of a temperature sensor circuit according to the embodiment.

FIG. 5 shows the output temperature characteristics of the terminals of this embodiment in which the cross-point is set to 25° C. Therefore, temperature compensation for various types of electrical circuits can be performed using the voltage extracted from any one of the terminals of the temperature sensor circuit. In this embodiment, the cross-point is 25° C. irrespective of the terminal from which a voltage is extracted, so the voltage does not differ based on the selected terminal.

Figure 10:
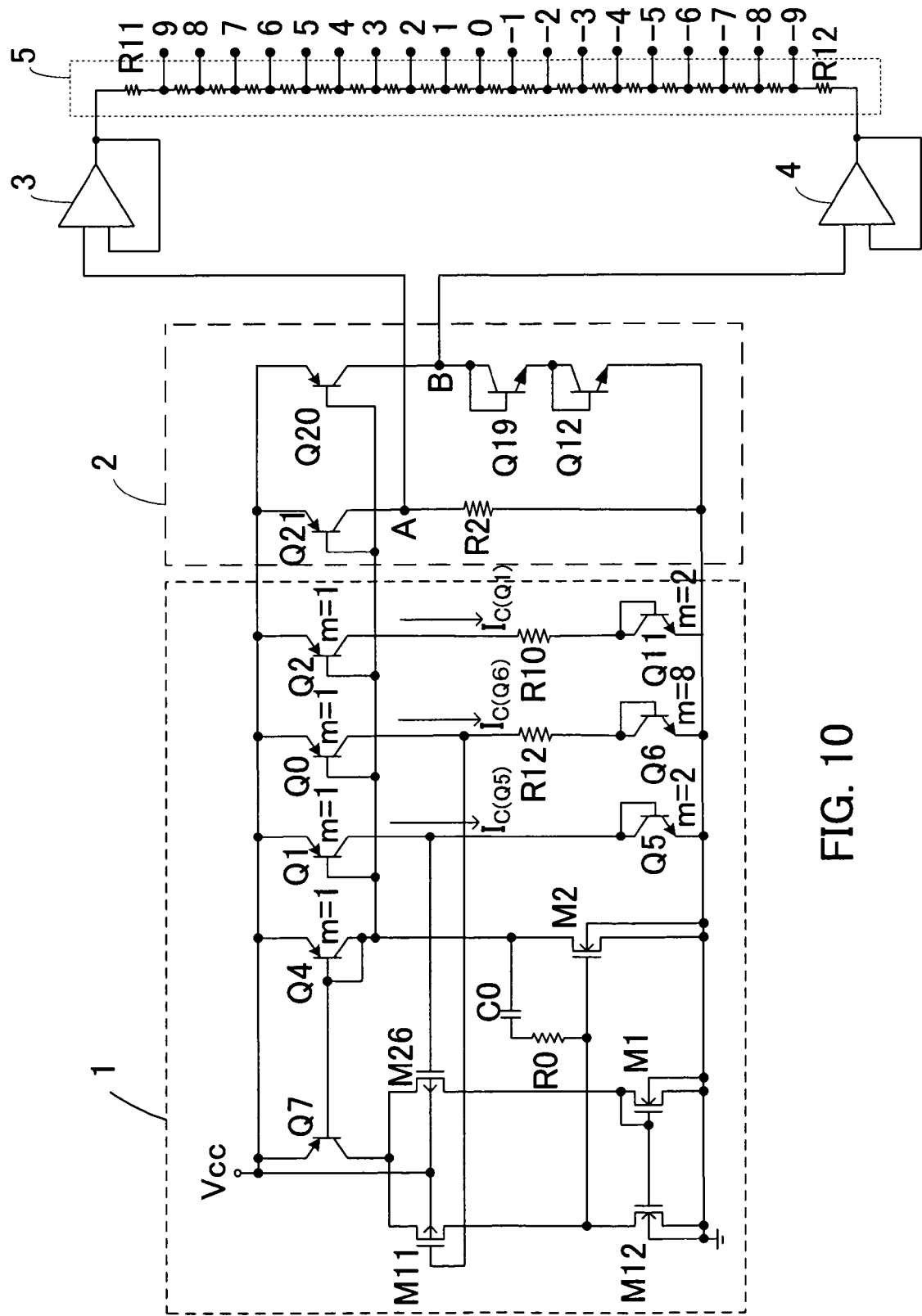
FIG. 10 is a schematic circuit diagram of a temperature sensor circuit according to a second embodiment of the present invention.

Next, a temperature sensor circuit according to a second embodiment of the present invention will be described. FIG. 10 shows a temperature sensor circuit according to a second embodiment. The second embodiment differs from the first embodiment shown in FIG. 1 only in the band-gap reference voltage circuit 1 (the left side portion surrounded by dashed lines) as a basic component circuit of this temperature sensor circuit. The output circuit 2, the buffer amplifiers 3 and 4, and the voltage divider circuit 5 are the same as those of the first embodiment. Therefore, only the band-gap reference voltage circuit 1 will be explained, and detailed descriptions for the other structures will be omitted by allotting the same reference numeral to the corresponding portion.

This band-gap reference voltage circuit (constant-voltage circuit) 1 includes an amplifier circuit shown on the left side of FIG. 10, and first to fourth series circuits shown on its right side.

The amplifier circuit is formed by a bipolar transistor Q7, MOS transistors M11, M26, M12, and M1. The emitter of the bipolar transistor Q7 is connected to the power source voltage terminal $V_{CC}$, and the collector thereof is commonly connected to the sources of the MOS transistors M11 and M26. The drains of MOS transistors M11 and M26 are connected to the drains of MOS transistor M12 and diode-connected MOS transistor M11 respectively. These gates of the MOS transistors M12 and M11 are connected to each other to form the current mirror circuit. The sources of the MOS transistor M12 and M1 are both grounded.

The first series circuit includes a diode-connected bipolar transistor Q4 and a MOS transistor M2 connected in series. The emitter of the diode-connected bipolar transistor Q4 is connected to the power source voltage terminal $V_{CC}$, the collector thereof is connected to the drain of the MOS transistor M2, and the source of the MOS transistor M2 is grounded. The base of the bipolar transistor Q4 is connected to the base of the bipolar transistor Q7 of the amplifier circuit. The transistors Q4 and Q7 form a current mirror circuit. The drain and gate of the MOS transistor M2 are connected via a resistor R0 and a capacitor C0, and the gate of the MOS transistor M2 is connected to the drain of the MOS transistor M12 of the amplifier circuit.

The second series circuit includes a bipolar transistor Q1 and a diode-connected bipolar transistor Q5 connected in series. The emitter of the bipolar transistor Q1 is connected to the power source voltage terminal $V_{CC}$, and the collector thereof is connected to the collector of the diode-connected bipolar transistor Q5. The emitter of the transistor Q5 is grounded. The collector of the bipolar transistor Q1 is connected to the gate of the MOS transistor M26 of the amplifier circuit.

The third series circuit includes a bipolar transistor Q0, a resistor R12, and a diode-connected bipolar transistor Q6 connected in series. The emitter of the bipolar transistor Q0 is connected to the power source voltage terminal $V_{CC}$, and the collector thereof is connected to one end of the resistor R12. The other end of the resistor R12 is connected to the collector of the diode-connected bipolar transistor Q6, and the emitter of the transistor Q6 is grounded. The collector of the bipolar transistor Q0 is connected to the gate of the MOS transistor M11 of the amplifier circuit.

The fourth series circuit includes a bipolar transistor Q2, a resistor R10, and a diode-connected bipolar transistor Q11 connected in series. The emitter of the bipolar transistor Q2 is connected to the power source voltage terminal $V_{CC}$, and the collector thereof is connected to one end of the resistor R10 (upper end in FIG. 10), and the other end of the resistor R10 is connected to the collector of the bipolar transistor Q11. The emitter of the transistor Q11 is grounded.

The bipolar transistors Q4, Q1, Q0, and Q2 forming the series circuits 1 to 4 and the bipolar transistors Q21 and Q20 forming the output circuit are commonly connected at bases. In FIG. 10, "m" denotes the number of transistors connected in parallel.

In this embodiment, the ratio of the numbers of the bipolar transistors Q5 forming the second series circuit to the number of the bipolar transistors Q6 forming the third series circuit is set to 1:4. In the present invention, however, the ratio of the number of transistors is not limited to the above and can be set arbitrarily.

The band-gap reference voltage circuit 1 according to this embodiment has the same principle of operation as that of a conventionally known constant-voltage circuit. That is, the voltage of the collector terminal of the bipolar transistor Q5 forming the second series circuit and the voltage of one end of the resistor R12 forming the third series circuit are applied to the gate of the MOS transistor M26 forming the amplifier circuit and the gate of the MOS transistor M11 forming the amplifier circuit, respectively, to compare both the voltages, so that the current $I_{C(Q5)}$ of the second series circuit and the current $I_{C(Q6)}$ of the third series circuit are controlled to have the same constant current.

The ratio of the number of the transistors Q5 of the second series circuit to the number of transistors Q6 of the third transistor is set to 1:4 in this embodiment. Therefore, as well-known, the current $I_{C(Q6)}$ flowing through the third series circuit is represented by the following equation.

$$I_{C(Q6)} = (V_T \ln 4)/R12$$

where $V_T$ is a thermal voltage (kT/q), k is a Boltzmann constant, T is an absolute temperature, and q is a unit charge of electron.

Therefore, the same current as the current specified by $I_{C(Q1)} = (V_T \ln 4)/R12$ flows through the fourth series circuit.

As described above, also in the temperature sensor circuit according to this embodiment, the same effects as those of the temperature sensor circuit according to the first embodiment shown in FIG. 1, such as, e.g., extracting a voltage having any temperature coefficient, can be obtained.

The temperature sensor circuit according to the abovementioned embodiments can be preferably used for performing temperature compensation of electric circuits. However, it should be noted that the circuit can also be used simply as a temperature sensor for measuring temperatures.

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof and/or any portion thereof etc. In some examples, various embodiments may include overlapping features. In this disclosure and during the prosecution of this case, the following abbreviated terminology may be employed: "e.g." which means "for example;" and "NB" which means "note well."

What is claimed is:
1. A temperature sensor circuit comprising:
a band-gap reference voltage circuit configured to offset a positive temperature coefficient of a voltage appeared at a resistor and a negative temperature coefficient of a base-emitter voltage of a diode-connected bipolar transistor, wherein the resistor and the diode-connected bipolar transistor are separated into a transistor-resistor series circuit in which a bipolar transistor and a resistor are connected in series, and a transistor-diode series circuit in which a bipolar transistor and a diode-connected bipolar transistor are connected in series, wherein the transistor-resistor series circuit is configured such that an emitter of the bipolar transistor is connected to a power supply voltage terminal, a collector thereof is connected to one end of the resistor, and the other end of the resistor is grounded, and wherein the transistor-diode series circuit is configured such that an emitter of the bipolar transistor is connected to the power supply voltage terminal, a collector thereof is connected to a collector of the diode-connected bipolar transistor, and an emitter of the diode-connected bipolar transistor is grounded;

a first buffer circuit in which an input terminal thereof is connected to the one end of the resistor of the transistor-resistor series circuit;

a second buffer circuit in which an input terminal thereof is connected to a collector of the diode-connected bipolar transistor of the transistor-diode series circuit; and a voltage divider circuit connected between an output terminal of the first buffer circuit and an output terminal of the second buffer circuit, and configured to divide a voltage appeared between the output terminals so that a voltage having any one of temperature coefficients different from each other can be extracted.

2. The temperature sensor circuit as recited in claim 1, wherein the voltage divider circuit includes a resistor ladder having a plurality of terminals each for extracting a voltage.

3. The temperature sensor circuit as recited in claim 1, wherein the voltage divider circuit includes a first resistor, a resistor ladder having a plurality of terminals each for extracting a voltage, and a second resistor, and wherein the first resistor, the resistor ladder and the second resistor are connected in series.

4. The temperature sensor circuit as recited in claim 2, wherein the resistor ladder is formed by a plurality of MOS transistors connected in series.

5. The temperature sensor circuit as recited in claim 1, wherein a resistance value of the resistor of the transistor-resistor series circuit is set so that a cross-point of output temperature characteristics of a plurality of voltages having different temperature coefficients and extracted from the voltage divider circuit becomes a predetermined temperature.

6. The temperature sensor circuit as recited in claim 2, wherein a resistance value of the resistor of the transistor-resistor series circuit is set so that a cross-point of output temperature characteristics of a plurality of voltages having different temperature coefficients and extracted from the voltage divider circuit becomes a predetermined temperature.

7. The temperature sensor circuit as recited in claim 3, wherein a resistance value of the resistor of the transistor-resistor series circuit is set so that a cross-point of output temperature characteristics of a plurality of voltages having different temperature coefficients and extracted from the voltage divider circuit becomes a predetermined temperature.

8. The temperature sensor circuit as recited in claim 4, wherein a resistance value of the resistor of the transistor-resistor series circuit is set so that a cross-point of output temperature characteristics of a plurality of voltages having different temperature coefficients and extracted from the voltage divider circuit becomes a predetermined temperature.

9. The temperature sensor circuit as recited in claim 5, wherein the predetermined temperature at the cross-point is 25° C.

10. The temperature sensor circuit as recited in claim 4, further comprising one or a plurality of MOS transistors interposed between the first buffer circuit and one end of the resistor ladder, and one or a plurality of MOS transistors interposed between the second buffer circuit and the other end of the resistor ladder, whereby any one of voltages having only positive temperature coefficients falling within a predetermined range, only negative temperature coefficients falling within a predetermined range, or temperature coefficients falling within a predetermined range covering both positive and negative temperature coefficients can be extracted from the resistor ladder.

11. The temperature sensor circuit as recited in claim 1, wherein the diode-connected bipolar transistor of the transistor-diode series circuit includes two diode-connected bipolar transistors connected in series and imposed by forward bias.

12. The temperature sensor circuit as recited in claim 1, wherein the band-gap reference voltage circuit comprises:

a first series circuit including a first diode-connected bipolar transistor, a second bipolar transistor, and a third resistor connected in series, wherein an emitter of the first bipolar transistor is connected to the power supply voltage terminal, a collector of the first bipolar transistor is connected to a collector of the second bipolar transistor, and an emitter of the second bipolar transistor is a grounded via the third resistor;

a second series circuit including a third bipolar transistor, a fourth bipolar transistor, and a fourth resistor connected in series, wherein an emitter of the third transistor is connected to the power supply voltage terminal, a collector of the third bipolar transistor is connected to a collector of the fourth bipolar transistor, and an emitter of the fourth bipolar transistor is grounded via the fourth resistor;

a third series circuit including a fifth bipolar transistor, a fifth resistor, a sixth diode-connected bipolar transistor, and a sixth resistor, wherein an emitter of the fifth bipolar transistor is connected to the power supply voltage terminal, a collector of the fifth bipolar transistor is connected to a collector of the sixth diode-connected bipolar transistor via the fifth resistor, and an emitter of the sixth diode-connected bipolar transistor is grounded via the sixth resistor; and a fourth series circuit including a seventh bipolar transistor, a seventh resistor, and an eight diode-connected bipolar transistor, wherein an emitter of the seventh bipolar transistor is connected to the power supply voltage terminal, a collector of the seventh bipolar transistor is connected to a collector of the eighth bipolar transistor via the seventh resistor, and an emitter of the eighth diode-connected bipolar transistor is grounded, wherein the first diode-connected bipolar transistor and the third bipolar transistor are connected at bases, forming a current mirror circuit, wherein the fourth bipolar transistor and the sixth diode-connected bipolar transistors are connected at bases, forming a current mirror circuit, wherein the collector of the third bipolar transistor is connected to a base of the fifth bipolar transistor, wherein the fifth bipolar transistor and the seventh bipolar transistor are connected at bases, and wherein the collector of the fifth bipolar transistor is connected to a base of the second bipolar transistor.

13. A temperature sensor circuit comprising:

a band-gap reference voltage circuit including a transistor-resistor-diode series circuit in which a bipolar transistor, a resistor, and a diode-connected bipolar transistor are connected in series, wherein an emitter of the bipolar transistor is connected to a power supply voltage terminal, a collector thereof is connected to a collector of the diode-connected bipolar transistor via the resistor, and an emitter of the diode-connected transistor is grounded;

an output circuit connected to the band-gap reference voltage circuit, wherein the output circuit includes a transistor-resistor series circuit in which a bipolar transistor and a resistor are connected in series, and a transistor-diode series circuit in which a bipolar transistor and a diode-connected bipolar transistor are connected in series, wherein the transistor-resistor series circuit is configured such that an emitter of the bipolar transistor is connected to the power supply voltage terminal, a collector thereof is connected to one end of the resistor, and the other end of the resistor is grounded, wherein the transistor-diode series circuit is configured such that an emitter of the bipolar transistor is connected to the power supply voltage terminal, a collector thereof is connected to a collector of the diode-connected bipolar transistor, and an emitter of the diode-connected bipolar transistor is grounded, and wherein the bipolar transistor of the transistor-resistor-diode series circuit, the bipolar transistor of the transistor-resistor series circuit, and the bipolar transistor of the transistor-diode series circuit are mutually connected at bases thereof; and a voltage divider circuit connected to the output circuit and configured to divide a voltage appeared between the one end of the resistor of the transistor-resistor series circuit and a collector of the diode-connected bipolar transistor of the transistor-diode series circuit so that a voltage having any one of temperature coefficients different from each other can be extracted.

14. The temperature sensor circuit as recited in claim 13, further comprising:
a first buffer circuit in which an input terminal thereof is connected to the one end of the resistor of the transistor-resistor series circuit and an output terminal thereof is connected to one end of the voltage divider circuit; and
a second buffer circuit in which an input terminal thereof is connected to a collector of the diode-connected bipolar transistor of the transistor-diode series circuit and an output terminal thereof is connected to the other end of the voltage divider circuit.

15. The temperature sensor circuit as recited in claim 14, wherein the voltage divider circuit includes a resistor ladder having a plurality of terminals each for extracting a voltage.

16. The temperature sensor circuit as recited in claim 14, wherein the voltage divider circuit includes a first resistor, a resistor ladder having a plurality of terminals each for extracting a voltage, and a second resistor, wherein the first resistor, the resistor ladder and the second resistor are connected in series.

17. The temperature sensor circuit as recited in claim 15, wherein the resistor ladder is formed by a plurality of MOS transistors connected in series.

18. The temperature sensor circuit as recited in claim 13, wherein a resistance value of the resistor of the transistor-resistor series circuit is set so that a cross-point of output temperature characteristics of a plurality of voltages having different temperature coefficients extracted from the voltage divider circuit becomes a predetermined temperature.

19. The temperature sensor circuit as recited in claim 18, wherein the predetermined temperature at the cross-point is 25° C.

20. The temperature sensor circuit as recited in claim 17, further comprising one or a plurality of MOS transistors interposed between the first buffer circuit and one end of the resistor ladder, and one or a plurality of MOS transistors interposed between the second buffer circuit and the other end of the resistor ladder, whereby any one of voltages having only positive temperature coefficients falling within a predetermined range or only negative temperature coefficients falling within a predetermined range, or temperature coefficients falling within a predetermined range covering both positive and negative temperature coefficients can be extracted from the resistor ladder.

* * * * *